United States Patent
Wijnands (10) Patent No.: US 9,491,091 B2
(45) Date of Patent: Nov. 8, 2016

(54) MLDP FAILOVER USING FAST NOTIFICATION PACKETS

(75) Inventor: Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 200 days.

(21) Appl. No.: 13/562,525

(22) Filed: Jul. 31, 2012

(65) Prior Publication Data

US 2013/0329546 A1 Dec. 12, 2013

Related U.S. Application Data

(60) Provisional application No. 61/657,622, filed on Jun. 8, 2012.

(51) Int. Cl.
| | |
|---|---|
| *H04J 1/16* | (2006.01) |
| *H04L 12/707* | (2013.01) |
| *H04L 12/18* | (2006.01) |
| *H04L 12/761* | (2013.01) |
| *H04L 12/703* | (2013.01) |
| *H04L 12/723* | (2013.01) |

(52) U.S. Cl.
CPC .......... *H04L 45/22* (2013.01); *H04L 12/1863* (2013.01); *H04L 45/16* (2013.01); *H04L 45/28* (2013.01); *H04L 45/50* (2013.01)

(58) Field of Classification Search
CPC ....... H04L 45/16; H04L 45/50; H04L 45/28; H04L 45/507; H04L 45/02; H04L 45/22; H04L 45/48; H04L 12/185; H04L 45/12; H04L 47/15; H04L 47/825

See application file for complete search history.

(56) References Cited

U.S. PATENT DOCUMENTS

| 7,826,345 | B2 | 11/2010 | Kam .............................. 370/216 |
| 8,107,363 | B1 | 1/2012 | Saluja ........................... 370/228 |
| 8,332,693 | B2* | 12/2012 | Cao et al. ........................ 714/43 |
| 2002/0075873 | A1* | 6/2002 | Lindhorst-Ko ......... H04L 45/00 370/394 |
| 2007/0036072 | A1* | 2/2007 | Raj et al. ....................... 370/225 |
| 2007/0174483 | A1* | 7/2007 | Raj et al. ....................... 709/238 |
| 2009/0154346 | A1* | 6/2009 | Sun ..................... H04L 12/1863 370/228 |
| 2012/0033542 | A1* | 2/2012 | Hanif ..................... H04L 45/00 370/217 |
| 2013/0322233 | A1 | 12/2013 | Csaszar ......................... 370/218 |

* cited by examiner

*Primary Examiner* — Chi H Pham
*Assistant Examiner* — Raul Rivas
(74) *Attorney, Agent, or Firm* — Campbell Stephenson LLP (57) ABSTRACT

An mLDP failover using fast notification packets. In one embodiment of a process for mLDP failover using fast notification packets, a first network node detects a failure of a second network node or a communication link coupled to the second network node. In response to detecting the failure, the first network node sends a packet to a third network node, wherein the packet comprises a notification of link or node failure and information identifying a multipoint label switched path (MLSP) that is configured to transmit multicast data packets of a multicast data stream.

22 Claims, 4 Drawing Sheets

MLDP FAILOVER USING FAST NOTIFICATION PACKETS

RELATED APPLICATIONS

This application claims the domestic benefit under Title 35 of the United States Code §119(e) of U.S. Provisional Patent Application Ser. No. 61/657,622, entitled "MLDP Failover Using Fast Notification Packets," filed Jun. 8, 2012, and naming Ijsbrand Wijnands as the inventor, which is hereby incorporated by reference in its entirety and for all purposes as if completely and fully set forth herein.

BACKGROUND OF THE INVENTION

Multicast enables simultaneous transmission of data packets between a source (e.g., a server identified by a source IP address) and select receivers (e.g., desktop computers in a group identified by a multicast group IP address). In packet-switched networks, multicast data packets are forwarded to receivers through a multicast distribution tree that consists of number of network nodes (e.g., routers). The terms node and router will be used interchangeably, it being understood that the term node should not be limited to a router. Multicast distribution trees can be built using Protocol Independent Multicast (PIM), which supports different modes of operation including: PIM sparse-mode (PIM SM), PIM bidirectional (PIM-bidir) and PIM source-specific multicast (PIM SSM).

The routers in a packet-switched distribution tree forward multicast data packets based on information (e.g., the source and/or group IP addresses) contained in packet headers. Some routers of the tree are responsible for replicating multicast data packets at bifurcation points (the points of the tree where branches fork). This means that only one copy of a multicast data packet travels over any particular link in the network, making multicast distribution trees extremely efficient for distributing the same information to many receivers.

Businesses and other entities often employ private packet-switched networks to transmit multicast packets between network components (e.g., sources and receivers). As a business grows, so can its network, increasing the number of network elements, network links, and geographic diversity. The network elements can be scattered throughout a city, a state, a country, or the world. Since it can be prohibitively expensive to create a private network that spans great distances, many businesses opt to rely upon a third-party provider's network to provide connectivity between network elements at disparate geographic sites. In order for the business' network to seamlessly function through the provider's network, the provider's network must be able to provide a medium for transmission of various types of data packets, including packets of a multicast data-stream.

DETAILED DESCRIPTION

Multiprotocol Label Switching (MPLS) is a network technology often employed by third party providers. MPLS networks can transmit multicast packets between source and receivers via a label switched path (LSP). Multicast packets enter an MPLS network via an edge label switch router (hereinafter ingress router), travel along a point-to-multipoint or multipoint-to-multipoint LSP via one or more core label switched routers (hereinafter core routers), and exit via one or more edge label switched routers (hereinafter egress routers). The present disclosure will be described with reference to point-to-multi point LSPs, it being understood the claims should not be limited thereto.

In general, ingress routers of MPLS networks assign short, fixed-length, locally significant identifiers called labels to incoming multicast data packets. When assigning a label to an incoming packet, the ingress router may look at information (e.g., the source and/or group address) of the packet's IP header and also some other information such as the router interface at which the packet arrived, to determine the appropriate label to assign. Labeled packets are forwarded downstream along an LSP that may include several routers, each of which decides which way to forward a packet based on the label of the packet it receives. More particularly, routers can use label information base (LIB) tables to map the label of the packet it receives to an outgoing label and an outgoing interface. The router swaps the label of the packet with the mapped outgoing label, which tells the next-hop router in the LSP how to forward the packet. The packet is transmitted to the next-hop router via the outgoing interface that is also identified in the LIB. The routers forward the packet in a hop-by-hop fashion until the packet reaches an egress router. MPLS routers make forwarding decisions based on a label, which is simpler when compared to the forwarding decisions made by routers of a PIM distribution tree. Branching routers in LSPs replicate packets as needed and forward the original and replicated packets to the next-hop routers with distinct labels attached thereto, respectively. A set of labels from an ingress router to an egress router in an MPLS network can defines a LSP.

LSPs can be provisioned in an MPLS network using a Label Distribution Protocol (LDP). This protocol enables nodes to distribute labels to neighbor nodes when creating paths in an MPLS network. U.S. patent application Ser. No. 11/267,674 describes an example in-band multicast LDP (mLDP) technique that can be used to establish a point-to-multipoint LSP through an MPLS network, and is hereby included by reference herein. These LSPs can be used to "connect" multicast group receivers on one side of an MPLS network to a source on the other side of the MPLS network, so that multicast packets transmitted by the source can reach the receivers notwithstanding an intervening third-party provider MPLS network.

Routers or communication links therebetween within an MPLS network can fail at the worst of times. When this happens, receivers may not receive multicast traffic. A failure can be repaired using restoration mechanisms disclosed herein. The restoration mechanisms may use secondary paths or standby LSPs to route multicast traffic around failed routers or links, thereby restoring the flow of multicast packets between sources and receivers. For purposes of explanation only, this disclosure will be described with reference to restoration mechanisms employed in mLDP enabled MPLS networks.

Restoration mechanisms can operate as downstream or upstream solutions to failures in links or routers. In the downstream version, multicast data packets and redundant copies thereof are concurrently sent downstream on primary and corresponding secondary LSP paths (hereinafter paths). The primary and secondary paths can merge at routers (hereafter merge points) also called repair routers or nodes. In this version, a merge point router concurrently receives packets from an upstream, next-hop router on the primary path and redundant copies from an upstream, next-hop router on the secondary path. Normally, the merge point router accepts the packets from the primary, and discards redundant packets received from the secondary. However, when a failure occurs on an upstream link or router such that the merge point router no longer receives packets at the primary path interface, a repair can be implemented by changing the interface of the merge point router at which packets are accepted. After the change, packets received from the secondary are accepted by the merge point router and transmitted to the next-hop downstream routers, thereby repairing the effects caused by the failed router or link. The repair is fast—greatly improving convergence times in the event of router or link failure. However, the downstream restoration mechanism requires extra bandwidth to transmit redundant multicast packets on the secondary path.

The upstream mechanism doesn't require extra bandwidth. The upstream mechanism employs active and standby LSPs; however, the standby LSP, which is divergent from the active LSP, does not transmit packets until it is told to do so by a root router (e.g., the ingress router). When a failure is detected in a router or link on the active LSP, a router or other device detects the failure and sends a message upstream towards the root router of the active and standby LSPs. The root router responds by deactivating the active LSP path and activating the standby LSP. However, at the router where the primary and secondary paths merge, there is no need to change the interface at which packets are accepted since the router has a forwarding state for both LSPs, and as a result the router will naturally forward packets from each LSP to the downstream next-router. While the upstream mechanism requires less bandwidth from the network, this version may introduce repair delay from the time the router or link failure is detected to the time the standby LSP is activated.

Point-to-multipoint LSPs are typically built from egress routers coupled directly or indirectly to a receiver(s) to a root router. Each router on the LSP knows its upstream and downstream neighbor routers. When a router detects a local failure (e.g., the failure of an upstream or downstream router and/or the link therebetween) at an interface, the router can determine which multicast data stream is affected by the failure. In one embodiment, if the interface is determined to be coupled to an upstream, next-hop router of a primary path, the router can send a downstream fast notification packet (DFNP) to notify all relevant downstream routers. This DNFP quickly tells routers, which expect packets from the affected multicast stream, that a failure has occurred. The DFNP, which should include a label, enables the downstream router that receives it to uniquely identify the affected multicast stream. Based on the DFNP it receives, a downstream router on the primary path that is a merge point of a primary path and a corresponding secondary path of the affected multicast stream can quickly switch to receive packets from the upstream, next-hop router of the secondary path, and restore multicast traffic flow to relevant downstream next-hop routers towards the egress router.

In an alternative embodiment, if the local failure is at an interface coupled a downstream, next-hop router, the router that detects the failure can send an upstream fast notification packet (UFNP) towards the root router for the affected multicast data stream. If the root router has a standby LSP corresponding to UFNP, the root router deactivates the active LSP, and begins sending packets down the standby LSP. A downstream merge point router that merges the active and standby LSPs will forward the packets it receives from the newly activated standby LSP to the downstream next-hop router(s), thereby restoring the flow of the multicast stream to the egress router(s). Sending the packets in this manner is advantageous in a number of situations, including situations in which aggregation is performed.

The DNFP can be treated as a label-switched packet and forwarded in the manner of an actual data packet (i.e., sent down the LSP as an MPLS packet). This allows the routers forwarding the packet to perform packet inspection, and so, determine/detect that the packet is a DFNP. These routers will typically detect this based on the IP packet behind the label. This IP packet can have, for example, a special UDP port number and/or IP address that identifies the DFNP. Advantageously, this allows routers that don't implement the DFNP feature to forward the packet as a normal data packet, such that other downstream routers can react to the failure. This approach is described in greater detail subsequently, in connection with FIG. 2.

The router that detects the failure at an interface can send the DFNP or UFNP from its data plane (e.g., a line card of the router) without involvement of a control plane of the router, and a router that receives the DFNP or UFNP can process it in its data plan without involvement of a control plane of the router. Ideally, the control plane should not be involved since it would delay the fast restoration of multicast traffic. The DFNP can very quickly tell a downstream router to begin accepting and forwarding packets that are received from an upstream, next-hop router of secondary path. The control plane can be subsequently updated a bit later via the interior gateway protocol (IGP) to account for the switch, so that eventually the control plane and data plane will be in sync. The UFNP can quickly tell a root router to activate a standby path.

Figure 1:
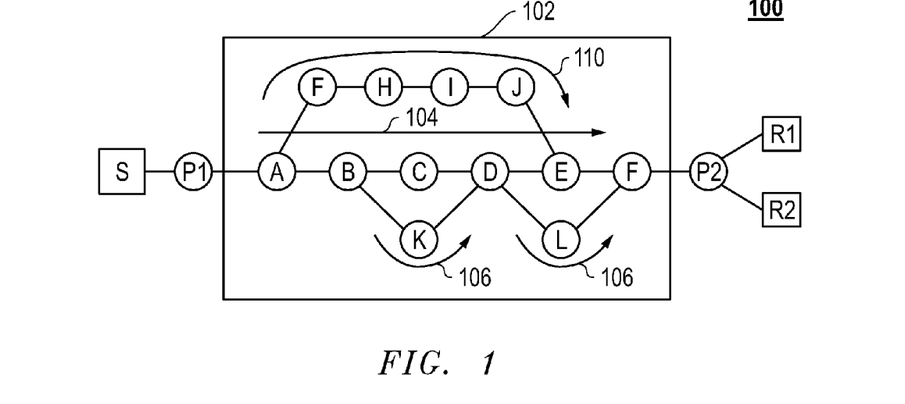
FIG. 1 is a simplified block diagram of a network performing a multicast transmission.

FIG. 1 illustrates a network 100 in block diagram form that includes a source S coupled to receivers R1 and R2 via PIM enabled routers P1 and P2 and an intervening MPLS network 102. Source S may take form in a server that generates a stream of multicast data packets for transmission to receivers R1 and R2, which may take form in desktop computer systems. These multicast data packets are transmitted to receivers R1 and R2 through PIM enabled routers P1 and P2 and through a primary point-to-multipoint label switched path (hereinafter primary path) 104 in MPLS network 102. Routers P1 and P2 may be part of a private network. MPLS network 102 may be a third party provided network that is engaged to provide multicast data communication services between sources and receivers of the private network. As will be described below, a standby label switched path or several secondary label switched paths are created in the MPLS network to restore multicast flow should a router or link along primary path, such as primary path 104, fail.

MPLS network 102 includes MPLS enabled routers A-L, it being understood that MPLS network 102 may include many more. In one embodiment a primary path 104 is established through routers A-F so that multicast packets of a particular stream can be transmitted to router P2. In addition to being PIM enabled, router A acts as the ingress or root router for primary path 104, and router F acts as the egress router for the primary path 104. Active secondary paths 106 and 110 are established as shown. The secondary paths correspond to primary path 104 and can be used to repair primary path 104 if a router or link within it fails. In an another embodiment, multicast packets are normally transmitted from ingress router A to egress router F via active LSP 104, with 110 acting as a standby LSP should a router or link in active LSP 104 fail. MPLS network 102 can be implemented as a dual plane network with active LSPs and secondary paths created in one plane. Routers A-L are mLDP enabled and capable of operating in accordance with, for example, the invention described in U.S. patent Ser. No. 11/267,674. Creation of the primary and second paths are well understood in the art.

Source S generates multicast data packets destined for receivers R1 and R2 identified by multicast IP address G. With respect to downstream restoration, it is presumed that the primary and secondary paths (i.e., 104-110) have been created, that receivers R1 and R2 have joined the multicast group G, and that the receivers are receiving packets initially via primary path 104. With respect to upstream restoration, it is presumed that primary path 104 and standby path 110 have been created, and that receivers are receiving packets initially via primary path 104. Although not shown, primary path 104 may have a branching router that replicates packets for subsequent transmission downstream towards another branch (not shown) of primary path 104 to another egress router (not shown) for subsequent transmission to one or more additional receivers (not shown).

Figure 2:
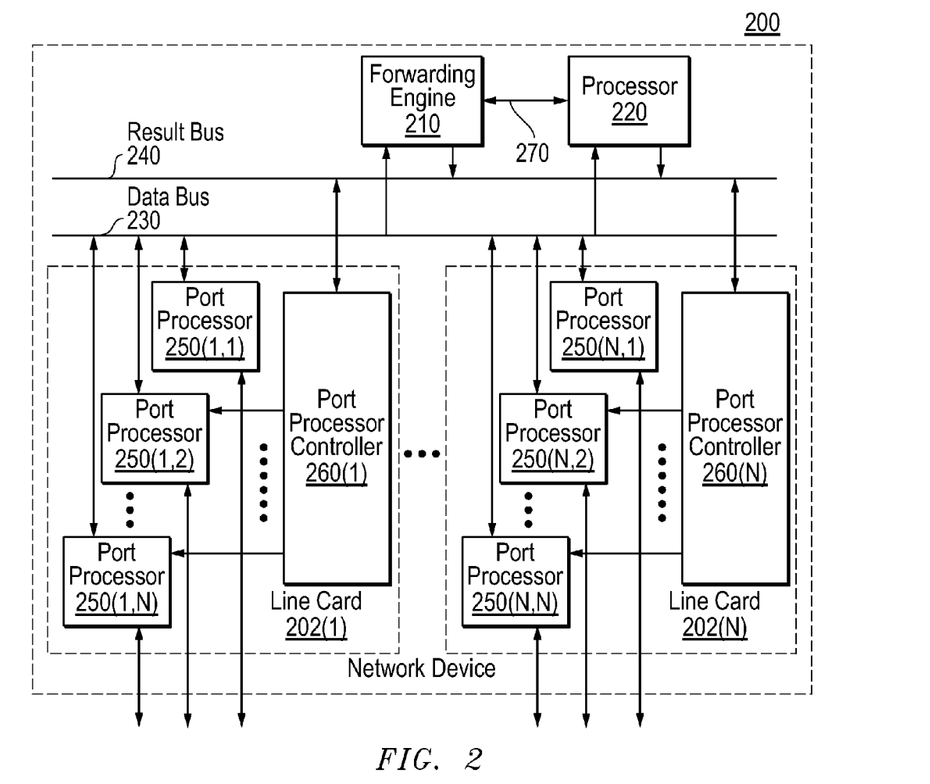
FIG. 2 is a simplified block diagram of a router suitable for implementing one or more aspects of one embodiment of the present disclosure.

FIG. 2 is a simplified block diagram illustrating an example of a router 200 that can be employed in network 100. In this depiction, router 200 includes a number of line cards (line cards 202(1)-(N)) that are communicatively coupled to a forwarding engine 210 and a processor 220 via a data bus 230 and a result bus 240. Line cards 202(1)-(N) include a number of port processors 250(1,1)-(N,N) which are controlled by port processor controllers 260(1)-(N). It will also be noted that forwarding engine 210 and processor 220 are not only coupled to one another via data bus 230 and result bus 240, but are also communicatively coupled to one another by a communications link 270.

The processors 250 and 260 of each line card 402 may be mounted on a single printed circuit board. When a packet is received, the packet may be identified and analyzed by router 400 in the following manner. Upon receipt, a packet (or some or all of its control information) is sent from the one of port processors 250(1,1)-(N,N) at which the packet was received to one or more of those devices coupled to data bus 230 (e.g., others of port processors 250(1,1)-(N,N), forwarding engine 210 and/or processor 220). Handling of the packet can be determined, for example, by forwarding engine 210. For example, forwarding engine 210 may determine that the packet should be forwarded to one or more of port processors 250(1,1)-(N,N). This can be accomplished by indicating to corresponding one(s) of port processor controllers 260(1)-(N) that the copy of the packet held in the given one(s) of port processors 250(1,1)-(N,N) should be forwarded to the appropriate one of port processors 250(1, 1)-(N,N). In addition, or alternatively, once a packet has been identified for processing, forwarding engine 210, processor 220 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Each of the port processors within the line card may be connected to an interface, which in turn may be coupled to a communication link between routers. Each of the port processors, or other components within the line cards, are capable of detecting a failure at its corresponding interface. For example, a communication link coupled to the interface may an optical communication link that transmits data as light. If the port processor or another component (e.g., a light sensor coupled to the port processor) fails to detect light on the link, the port processor will generate a signal indicating link failure. Further, port processor or other component may generate messages that are sent via an interface for subsequent transmission over the communication link to a neighbor router. If the neighbor router does not respond to the message, the port processor will indicate that the link or the router coupled thereto has failed. Other processes are contemplated for detecting failure of a link or router coupled to an interface of a line card. Although not shown, line card may also include memory that store instructions that can be implemented in response to the detection of a failure at an interface. These processes will be more fully described below.

Figure 3:
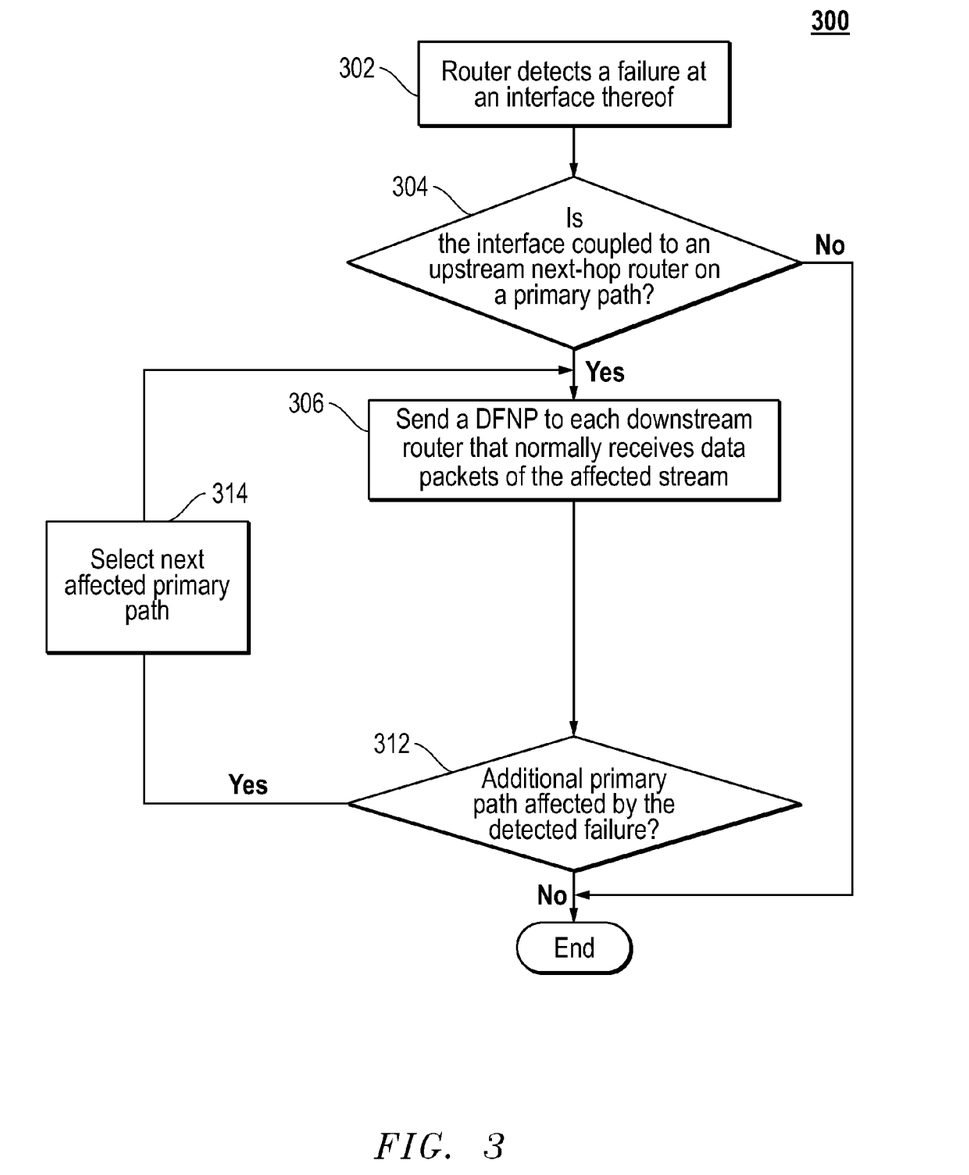
FIG. 3 is a flow chart illustrating relevant aspects of a process for triggering a downstream restoration mechanism according to one aspect of the disclosure.
Figure 4:
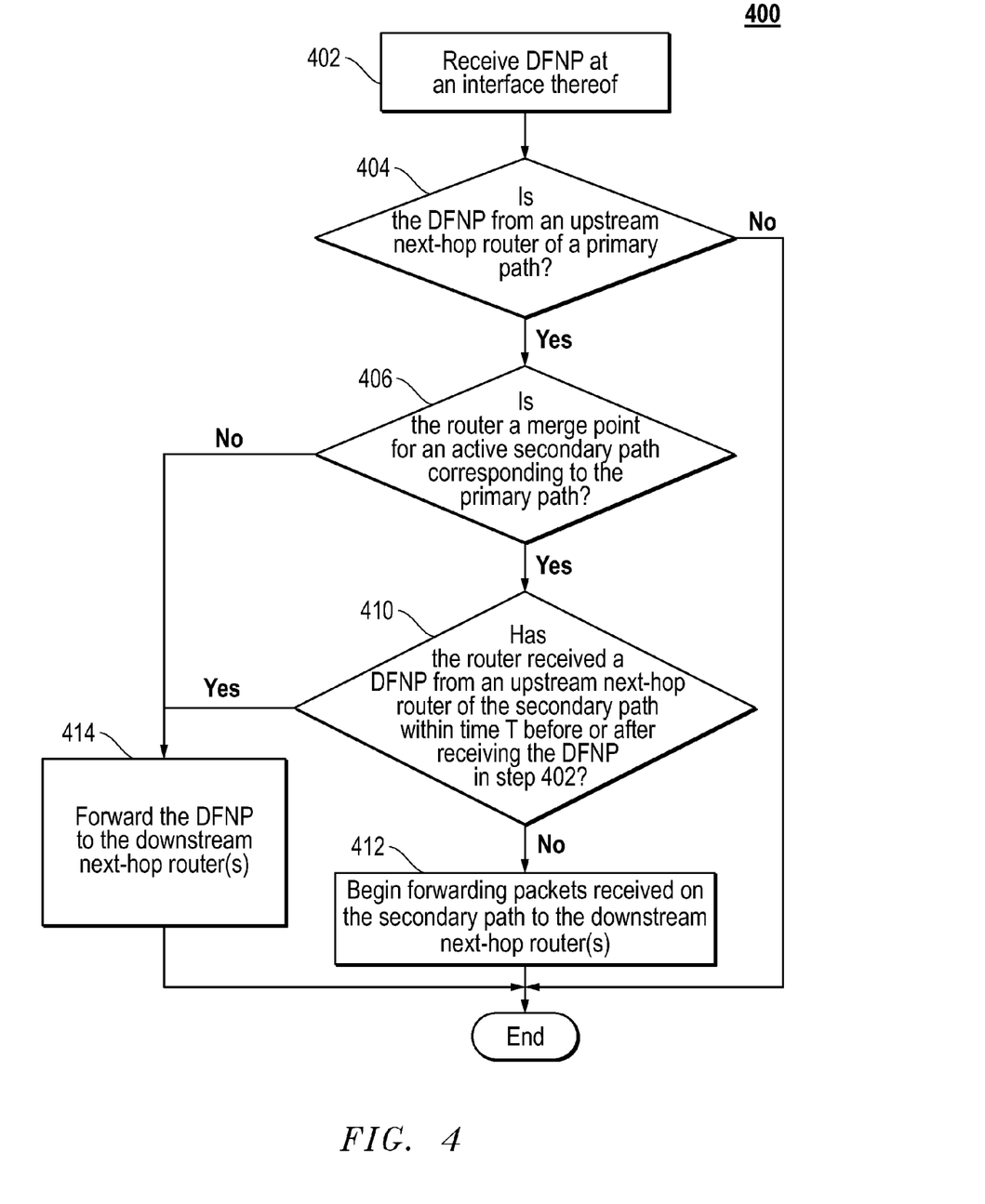
FIG. 4 is a flow chart illustrating relevant aspects of a process performed by a router that receives a downstream fast notification packet.

Routers and communication links between routers can fail. When this happens, multicast packets of a stream that flows through the failed router or link cannot be transmitted to receivers R1 and R2 until the failure is repaired, for example, by bypassing the failed router or link. FIGS. 3 and 4 illustrate one embodiment for implementing an example downstream restoration mechanism within network 102 shown in FIG. 1 that can be employed to repair the effects of a failed router or link. In FIG. 3, process 300 is started when a router detects a failure at an interface thereof as shown in step 302. Again, the failure of a node or a link at an interface may be detected in response to a line card not receiving a response to a message that is sent at the interface. In step 304, a determination is made as to whether the interface is coupled to an upstream next-hop router on a primary path. In one embodiment, this can be accomplished within the data plane by accessing memory (e.g., LIBs) within the line card using an identity of the failed interface to identify path related information (e.g., forwarding equivalency class, incoming label, etc.) mapped to the interface identifier. In step 306, the line card coupled to the failed node or link can send a DFNP to each downstream next-hop router to which packets of the multicast stream are normally sent.

As noted earlier, in one embodiment, these DFNPs will include the appropriate outgoing label that is assigned to packets that are sent to the downstream, next-hop router. The DFNP in one embodiment can be an IP packet with a special UDP port number and an MPLS header associated with it. The label pushed on the stack is the label of the path that needs to be followed downstream. The IP packet address can be within the range of 127/8, such that it will never be forwarded outside MPLS network 102. The UDP packet may include a time stamp and a unique originator ID (e.g., a sequence number generated by the line card), to distinguish it from other DFNP packets that might be generated by the line card. The DFNP should not be substantially different from normal data packets that are sent down a path. It is presumed that all routers within MPLS 102 support the downstream restoration mechanism. However, routers that do not support this feature will forward the DFNP along with other data packets down the appropriate label switched path. These routers will not be able to participate in repairing a primary path, but at least they will not prevent other downstream routers from repairing it. If there are additional primary paths that are affected by the detected failure, then step 310 is repeated. As will be appreciated in light of the present disclosure, in certain embodiments, the DFNP and the UFNP (both) will either be forwarded using a MPLS label from the LSP thus affected, or have the requisite label included in the payload of the packet that identifies the LSP.

Process 300 shown in FIG. 3 is one embodiment of a method for triggering a downstream restoration process. To illustrate or place this process in context, presume that router B in FIG. 1 fails. In response, router C on primary path 104 and router K on secondary path 106 detect the failure at interfaces coupled to router B. Router C determines that the interface coupled to the failed router is coupled to an upstream next-hop router (e.g., router B) on a primary path (path 104). In response, router C generates a DFNP which it sends to router D, which is a downstream next-hop router on primary path 104 that normally receives packets of the affected multicast stream. Router K also sends a DFNP to router D in response to detection of the failure at its interface coupled to router B in accordance with step 306. The DFNP sent by router K uses the label that router K normally attaches to the multicast packets that it sends down to router D. Likewise, router C generates the DFNP that includes the label that it normally attaches to multicast packets it transmits downstream to router D. The two labels within these DFNPs are different, and can be used, as explained above, by the downstream next-hop router to identify the affected multicast stream.

FIG. 4 illustrates an example process implemented by a router when it receives a DFNP. More particularly, as shown in FIG. 4 the process begins in step 402 when a DFNP is received at an interface of a router. The router can use the label or other information of the DFNP to determine whether the DFNP was sent by an upstream, next-hop router of a primary path, or an upstream, next-hop router of a secondary path. If a router determines that the DFNP is not received from an upstream, next-hop router of a primary path, the router presumes the DFNP is received from an upstream, next-hop router of a secondary path. The router may store the time at which this DFNP was received and an identity of the primary path corresponding to the secondary path. This information can be used in step 410. If the DFNP is determined to be received from an upstream, next-hop router on a secondary path, the received DFNP is discarded and the process in FIG. 4 ends. If, however, the DFNP is determined to be from an upstream, next-hop router of a primary path, the process proceeds to step 406 where the router determines whether it is a merge point for a secondary path that corresponds to the primary path. This information can be easily determined in the line card using data stored therein such as in an LIB or a copy of an LIB. If the router is determined not to be a merge point, the DFNP is forwarded to downstream, next-hop router or routers of to which the router normally sends multicast packets of the affected stream. It is noted that before being forwarded, the incoming label of the DFNP is swapped with an outgoing label for each downstream next-hop router before it is sent thereto. If, however, it is determined in step 410 that the router is a merge point for the primary path and a corresponding secondary path, the process proceeds to 410.

In step 410 the router determines if it has received a corresponding DFNP (i.e., a DFNP from an upstream, next-hop router of a secondary path that corresponds to the primary path). Moreover, if the router did receive a corresponding DFNP in step 410, the router also determines whether the corresponding DFNP was received within Time T before or after receiving the DFNP in step 402. In one embodiment, Time T should be relatively short so that the router can determine quickly whether it is merge point that can be used for repairing a failed node or link that was detected by the upstream router that originated the DFNP. If the corresponding DFNP was not received within Time T before or after receiving the DFNP in step 402, the DFNP the process proceeds to step 412 where the router changes the interface at which it receives packets for the affected multicast data stream. In other words, rather than discarding the packets that are received from the identified secondary path, the router begins forwarding the packets from the secondary path to the downstream, next-hop router or routers thereby restoring the flow of multicast packets and repairing the failure detected upstream. If is determined in step 410 that a corresponding DFNP from received from an upstream next-hop router on the secondary path is received within Time T before or after receiving the DFNP in step 402, then the router is not a merge point that can used to repair the failure, and the process proceeds to step 414 where the DFNP is forwarded to downstream, next-hop routers.

In the example above in which routers C and K detected the failure in node B, router D would receive DFNPs from both routers C and K via the primary path 104 and the active secondary path 106, respectively. Presume router D receives the DFNPs from upstream routers C and K within Time T of each other. Accordingly, router D would forward a DFNP to the next-hop router E that is downstream, and another DFNP downstream to router L. Each of these DFNPs will have the appropriate label added thereto by router D. Router E, in turn, will receive the DFNP from router D, and will determine that it is a merge point for primary path 104 and secondary path 110 that carries redundant multicast data packets. Since router E does not receive a corresponding DFNP from an upstream next-hop router of a corresponding secondary path (e.g., path 110) then router E begins forwarding multicast packets it receives from secondary path 110 toward egress router F of the primary path 104 in accordance with step 412 shown in FIG. 4. Moreover, router E does not forward the DFNP to router F, and as a result, router F receives only a DFNP via an upstream, next-hop router of a secondary path, and accordingly, drops the DFNP it receives. Ultimately, by forwarding the redundant multicast packets provided on active secondary path 110 to egress router F, router E repairs the failure of router B in the example. It is noted that router E repairs the effects of router B's failure without having to monitor the stream of data packets that router E receives along primary path 104 to determine whether a failure of primary path has occurred. Moreover, it is noted that router E repairs the failure that has occurred non-locally, i.e., a failure within a router or link that is not immediately coupled to router E.

Figure 5:
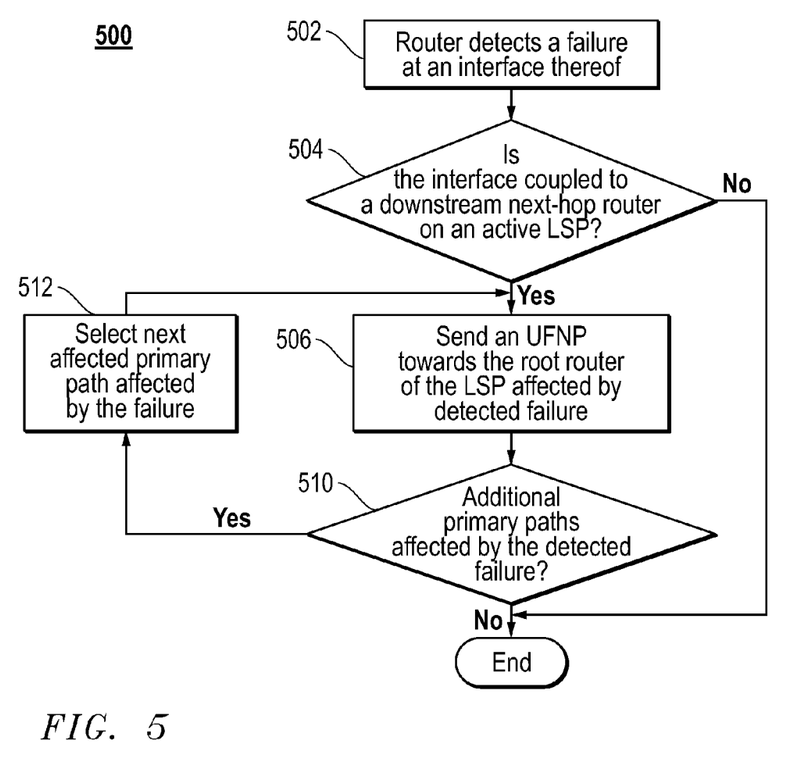
FIG. 5 is a flow chart illustrating relevant aspects of a process for triggering an upstream restoration mechanism according to one aspect of the disclosure.
Figure 6:
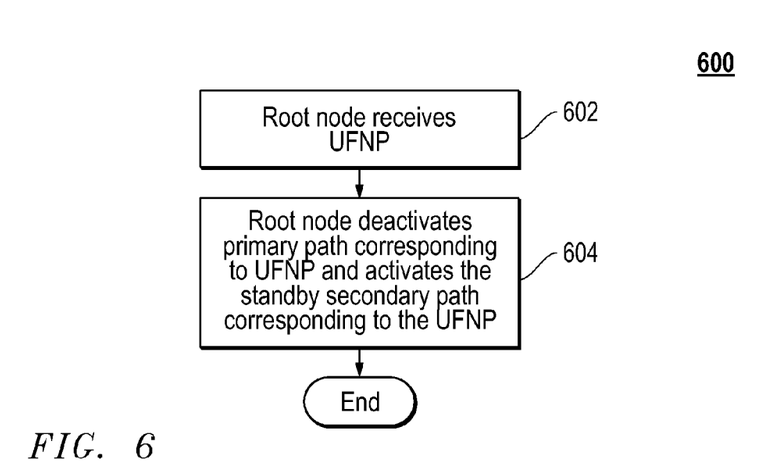
FIG. 6 is a flow chart illustrating relevant aspects of a process performed by root router that receives an upstream fast notification packet.

FIGS. 3 and 4 illustrate relevant aspects of a downstream restoration mechanism that is triggered by the detection of a failed router or link. FIGS. 5 and 6 illustrate aspects of an example upstream restoration mechanism that can be used to repair a failure of a link or a router within an active LSP such as primary path 104. In this embodiment, only path 110 is maintained by router A initially as a standby LSP for active LSP 2104. Thus, MPLS network 102 supports divergent LSPs between root router A and merge point router E, except for the fact that router A is shared between these two LSPs.

The process in FIG. 5 starts like the process shown within FIG. 3 when a router detects a failure at an interface thereof. A router can determine using the interface number and tables stored in memory whether the failed interface is coupled to a downstream next-hop router on an active path. This determination can be made at the data plane level within the line card. If in step 504 it is determined that the failed interface is coupled to a downstream next-hop router on an active path, then the process proceeds to 506 where a UFNP is sent by the router towards the root of the affected LSP. This step is repeated for each of the active LSPs that are affected by the detected failure. Sending a UFNP toward the root router is relatively easy for a multipoint-to-multipoint label switched path because an MPLS forwarding path is available to reach the root router. For point-to-multipoint paths, the UFNP could be sent to the root router using a point-to-point label switched path.

FIG. 6 illustrates the process of 600 implemented by the root router in response to receiving a UFNP. As noted above, in this embodiment, the root router should maintain a standby LSP corresponding to an active LSP. In response to receiving the UFNP, the root router deactivates the currently active LSP corresponding to the UFNP, and activates the corresponding standby LSP. In other words, the root router stops sending multicast packets down the currently active LSP and begins sending packets down the standby LSP. The merge point router (the router where the LSPs merge) will forward multicast packets to the next-hop downstream router(s), regardless of whether the multicast packets are received at the interface coupled to the active LSP or the interface coupled to the standby LSP. In other words, the merge point router need not take any active steps in the upstream restoration mechanism.

To illustrate the processes in FIGS. 5 and 6, suppose router C fails, and path 106 doesn't exist. In response to this failure, router B will detect the failure and send a UFNP to root router A in response to implementing step 506 shown in FIG. 5. Router A, in turn, deactivates the active, primary LSP 104 corresponding to the UFNP it receives, and activates standby LSP 110. Router E, receives the multicast packets via the LSP 110 and forwards same to egress router F, thereby repairing primary path 104 from the adverse affects of router C's failure.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a packet at a third network node, wherein
      the packet is received in response to a first network node detecting a failure of a second network node or a communication link coupled to the second network node,
      the packet comprises
         a notification of link or node failure and
         information identifying a multipoint label switched path (MLSP) that is configured to transmit multicast data packets of a multicast data stream, and via which the packet was received, wherein the information identifying the MLSP is a label that is assigned by the third network node to be attached to multicast data packets of the multicast data stream,
      the third network node is coupled to a primary path and a secondary path,
      the third network node is downstream from the first network node along the MLSP, and
      the third network node is configured to discard redundant packets received via the secondary path prior to the detecting the failure; and
   in response to the receiving the packet, determining whether the third network node is configured to act as a repair node.

2. The method of claim 1 wherein the third network node is a root network node of the MLSP or a network node that is in data communication between the first network node and the root network node.

3. The method of claim 1 further comprising the third network node modifying the packet to create a modified packet by swapping the label with a different label before sending the modified packet to a fourth network node that is downstream from the third network node along the MLSP, wherein the different label is assigned by the fourth network node to be attached to multicast data packets of the multicast data stream.

4. The method of claim 1 further comprising:
   the third network node receiving multicast data packets of the multicast data stream via the secondary path, wherein the secondary path comprises an alternative MLSP, after the detection of the failure by the first network node; and
   the third network node forwarding the multicast data packets received via the alternative MLSP to a fourth network node that is downstream from the third network node along the MLSP.

5. The method of claim 3 further comprising:
   the fourth network node receiving multicast data packets of the multicast data stream via the secondary path, wherein the secondary path comprises an alternative MLSP, after the detection of the failure by the first network node; and
   in response to the fourth network node receiving the modified packet, the fourth network node forwarding the multicast data packets received via the alternative MLSP to a fifth network node that is downstream from the fourth network node along the MLSP.

6. The method of claim 1 further comprising:
   another network node receiving multicast data packets of the multicast data stream via the secondary path, wherein the secondary path comprises an alternative MLSP, after the detection of the failure by the first network node; and
   in response to the other network node receiving the notification directly or indirectly via the third network node, the other network node forwarding the multicast data packets received via the alternative MLSP to a fourth network node that is downstream from the other network node along the MLSP.

7. A system comprising:
   a third network node, wherein
      the third network node receives a packet from a first network node, in response to the first network node detecting a failure of a second network node or a communication link coupled to the second network node, the packet comprises
- a notification of link or node failure and
- information identifying a multipoint label switched path (MLSP) that is configured to transmit multicast data packets of a multicast data stream, and via which the packet was received, wherein the information identifying the MLSP is a label that is assigned by the third network node to be attached to multicast data packets of the multicast data stream, and wherein the third network node is downstream from the first network node along the MLSP, the third network node is coupled to a primary path and a secondary path, the third network node is configured to discard redundant packets received via the secondary path prior to the detecting the failure, and in response to receiving the packet, the third network node determines whether the third network node is configured to act as a repair node.

8. The system of claim 7 wherein the third network node is a root network node of the MLSP or a network node that is in data communication between the first network node and the root network node.

9. The system of claim 7 further comprising:
the third network node modifying the packet to create a modified packet by swapping the label with a different label before sending the modified packet to a fourth network node that is downstream from the third network node along the MLSP, wherein the different label is assigned by the fourth network node to be attached to multicast data packets of the multicast data stream.

10. The system of claim 7 wherein:
the third network node is configured to receive multicast data packets of the multicast data stream via the secondary path, wherein the secondary path comprises an alternative MLSP, after the detection of the failure by the first network node; and
the third network node is configured to forward the multicast data packets received via the alternative MLSP to a fourth network node that is downstream from the third network node along the MLSP.

11. The system of claim 9:
the fourth network node is configured to receive multicast data packets of the multicast data stream via the secondary path, wherein the secondary path comprises an alternative MLSP, after the detection of the failure by the first network node; and
wherein the fourth network node is configured to forward the multicast data packets received via the alternative MLSP to a fifth network node that is downstream from the fourth network node along the MLSP in response to the fourth network node receiving the modified packet.

12. The system of claim 7 further comprising:
another network node configured to receive multicast data packets of the multicast data stream via the secondary path, wherein the secondary path comprises an alternative MLSP, after the detection of the failure by the first network node; and
wherein the other network node is configured to forward the multicast data packets received via the alternative MLSP to a fourth network node that is downstream from the other network node along the MLSP in response to the other network node receiving the notification directly or indirectly via the third network node.

13. A network node comprising:
a third circuit for receiving a packet in response to a first circuit detecting a failure of a second network node or a communication link coupled to the second network node, wherein the packet comprises
- a notification of link or node failure and
- information identifying a multipoint label switched path (MLSP) that is configured to transmit multicast data packets of a multicast data stream, and via which the packet was received, wherein the network node is downstream from the second network node along the MLSP, and wherein the information identifying the MLSP is a label that is assigned by the network node to be attached to multicast data packets of the multicast data stream, the network node is coupled to a primary path and a secondary path, and in response to receiving the packet, the network node determines whether the network node is configured to act as a repair node.

14. The network node of claim 13 further comprising:
a second circuit for modifying the packet to create a modified packet by swapping the label with a different label before sending the modified packet to a fourth network node that is downstream from the network node along the MLSP, wherein the different label is assigned by the fourth network node to be attached to multicast data packets of the multicast data stream.

15. The method of claim 1, wherein
the information comprises an indication whether the MLSP is the primary path or the secondary path.

16. The method of claim 1, wherein determining whether the third network node is configured to act as a repair node further comprises:
determining whether the packet was received via the primary path or the secondary path;
determining whether a second packet was received in response to the failure being detected; and
in response to determining that the second packet was received, determining whether the second packet was received via the primary path or the secondary path.

17. The network node of claim 13 wherein the network node comprises:
a root network node of the MLSP; or
a node that is in data communication between the network node and the root network node.

18. The network node of claim 13, wherein:
the network node receives multicast data packets of the multicast data stream via the secondary path, wherein the secondary path comprises an alternative MLSP, after the detection of the failure by the network node; and
the network node forwarding the multicast data packets received via the alternative MLSP to a fourth network node that is downstream from the network node along the MLSP.

19. The network node of claim 13, further comprising:
a fourth network node receiving multicast data packets of the multicast data stream via the secondary path, wherein the secondary path comprises an alternative MLSP, after the detection of the failure by the network node; and in response to the fourth network node receiving a modified packet, the fourth network node forwarding the multicast data packets received via the alternative MLSP to a fifth network node that is downstream from the fourth network node along the MLSP.

20. The network node of claim 13, further comprising:
an additional network node receiving multicast data packets of the multicast data stream via the secondary path, wherein the secondary path comprises an alternative MLSP, after the detection of the failure by the network node; and
in response to the additional network node receiving the notification directly or indirectly via the network node, the additional network node forwarding the multicast data packets received via the alternative MLSP to a fourth network node that is downstream from the additional network node along the MLSP.

21. The network node of claim 13, wherein
the information comprises an indication that the MLSP is one of the primary path or the secondary path.

22. The network node of claim 13, wherein determining whether the network node is configured to act as a repair node comprises:
determining whether the packet was received via the primary path or via the secondary path;
determining that a second packet was received based at least in part on the failure being detected; and
determining whether the second packet was received via the primary path or via the secondary path.

* * * * *